US011360875B2

(12) United States Patent
Wang et al.

(10) Patent No.: US 11,360,875 B2
(45) Date of Patent: Jun. 14, 2022

(54) SYSTEM AND METHOD FOR DETECTING FRAUDULENT ACTIVITY ON CLIENT DEVICES

(71) Applicant: Cognant LLC, Mountain View, CA (US)

(72) Inventors: Heng Wang, San Jose, CA (US); Arun Kejariwal, Fremont, CA (US); James Koh, Mountain View, CA (US); Ishan Upadhyaya, San Carlos, CA (US); Owen S. Vallis, Santa Clara, CA (US)

(73) Assignee: Cognant LLC, Mountain View, CA (US)

( * ) Notice: Subject to any disclaimer, the term of this patent is extended or adjusted under 35 U.S.C. 154(b) by 467 days.

(21) Appl. No.: 16/032,426

(22) Filed: Jul. 11, 2018

(65) Prior Publication Data

US 2019/0057009 A1  Feb. 21, 2019

Related U.S. Application Data

(60) Provisional application No. 62/545,623, filed on Aug. 15, 2017.

(51) Int. Cl.
*G06F 7/04* (2006.01)
*G06F 11/34* (2006.01)
(Continued)

(52) U.S. Cl.
CPC .......... *G06F 11/3438* (2013.01); *G06F 21/10* (2013.01); *G06F 21/552* (2013.01); *H04L 63/1425* (2013.01)

(58) Field of Classification Search
CPC ........ G06F 21/36; G06F 21/10; G06F 21/552; G06F 11/3438; H04L 63/1425; H04L 2463/1462; H04L 67/22
(Continued)

(56) References Cited

U.S. PATENT DOCUMENTS 8,103,543 B1 * 1/2012 Zwicky .................. G06Q 30/02
                                                            705/14.26
8,533,825 B1 * 9/2013 Marsa ................. H04L 63/1425
                                                            726/22

(Continued)

OTHER PUBLICATIONS

Kantardzic et al, Improving Click Fraud Detection by Real Time Data Fusion, Dec. 19, 2008, IEEE, pp. 69-74. (Year: 2008).*

(Continued)

*Primary Examiner* — Luu T Pham
*Assistant Examiner* — Jenise E Jackson
(74) *Attorney, Agent, or Firm* — Goodwin Procter LLP

(57) ABSTRACT

A method, a system, and an article are provided for detecting and managing anomalies associated with content presentations. An example computer-implemented method can include: obtaining a stream of data including a record of clicks on a plurality of client devices; aggregating the stream of data to generate a batch click stream for each of the client devices; processing the stream of data using a real-time anomaly detector to detect a first anomaly indicating that at least one of the client devices was previously associated with fraudulent clicks; processing each batch click stream using a batch anomaly detector to detect a second anomaly indicating that at least one of the batch click streams includes fraudulent clicks; and facilitating an adjustment of (Continued)

content presentations on the client devices, based on at least one of the detected first anomaly and the detected second anomaly.

20 Claims, 5 Drawing Sheets

(51) Int. Cl.
   *H04L 9/40* (2022.01)
   *G06F 21/10* (2013.01)
   *G06F 21/55* (2013.01)

(58) Field of Classification Search
   USPC .......................................................... 726/26
   See application file for complete search history.

(56) References Cited

U.S. PATENT DOCUMENTS

| | | | |
|---|---|---|---|
| 8,561,184 B1* | 10/2013 | Marsa | H04L 67/22 726/22 |
| 8,620,746 B2* | 12/2013 | Granville | G06Q 30/02 370/229 |
| 8,762,298 B1 | 6/2014 | Ranjan et al. | |
| 9,282,114 B1* | 3/2016 | Dotan | G06F 21/552 |
| 2006/0212350 A1* | 9/2006 | Ellis | G06Q 30/0242 705/14.41 |
| 2007/0061211 A1* | 3/2007 | Ramer | G06Q 20/12 705/25 |
| 2007/0255821 A1 | 11/2007 | Ge et al. | |
| 2008/0281606 A1* | 11/2008 | Kitts | G06Q 30/02 705/1.1 |
| 2009/0024971 A1* | 1/2009 | Willner | G06Q 30/02 716/106 |
| 2010/0169315 A1 | 7/2010 | Green et al. | |
| 2011/0208714 A1* | 8/2011 | Soukal | H04L 63/1425 707/709 |
| 2011/0296390 A1 | 12/2011 | Vidal et al. | |
| 2011/0314152 A1 | 12/2011 | Loder | |
| 2012/0036003 A1 | 2/2012 | Tong et al. | |
| 2013/0219498 A1 | 8/2013 | Lee et al. | |
| 2014/0089460 A1* | 3/2014 | Tola | H04L 29/08846 709/217 |
| 2014/0156390 A1* | 6/2014 | Aaron | G06Q 30/02 705/14.47 |
| 2014/0208425 A1 | 7/2014 | Palomaki | |
| 2014/0358671 A1* | 12/2014 | Wei | G06Q 30/0248 705/14.45 |
| 2015/0046254 A1* | 2/2015 | Raab | G06Q 30/0248 705/14.47 |
| 2015/0095146 A1* | 4/2015 | Adjaoute | G06Q 30/0269 705/14.53 |
| 2015/0101050 A1* | 4/2015 | Nielson | G06F 21/552 726/23 |
| 2015/0161661 A1* | 6/2015 | Granville | G06Q 30/02 705/14.45 |
| 2015/0206214 A1* | 7/2015 | Adjaoute | G06Q 20/4016 705/26.35 |
| 2015/0262227 A1* | 9/2015 | Messer | G06Q 30/0248 705/14.47 |
| 2016/0164915 A1* | 6/2016 | Cook | H04L 63/04 726/1 |
| 2016/0191554 A1* | 6/2016 | Kaminsky | H04L 63/1416 726/23 |
| 2016/0203337 A1* | 7/2016 | Dubovsk | G06F 16/215 726/30 |
| 2016/0248624 A1 | 8/2016 | Tapia et al. | |
| 2016/0321173 A1* | 11/2016 | Srinivasaiah | G06F 12/0261 |
| 2017/0061307 A1 | 3/2017 | Bates et al. | |
| 2017/0295251 A1* | 10/2017 | Kruglick | H04L 61/2007 |
| 2017/0323100 A1* | 11/2017 | Li | H04L 29/06 |
| 2018/0293816 A1 | 10/2018 | Garrett et al. | |
| 2018/0324064 A1* | 11/2018 | Tola | H04L 67/1097 |

OTHER PUBLICATIONS

Jiarui et al, Detecting Crowdsourcing Click Fraud in Search Advertising Based on Clustering Analysis, Aug. 14, 2015, IEEE, pp. 894-900. (Year: 2015).*

"Invisable ads could be defrauding advertisers out of nearly $1B a year," accessed on the Internet at: https://www.bizjournals.com/sanjose/news/2015/07/24/invisible-ads-could-be-defraudingadvertisers-out.html; downloaded Jul. 24, 2015.

"Make sure your ads are seen by real people," accessed on the Internet at: https://integralads.com/capabilities/ad-fraud/; downloaded on Dec. 17, 2018.

Anonymous:"Computer Network," accessed on the internet at: <URL:https://en.wikipedia.org/w/index.php?t;itle=Computer network &oldid=800710083>; downloaded on Sep. 28, 2018.

Kantardzic et al., "Click Fraud Prevention vi a multi modal evidence fusion by Dempster-Shafer theory," Multi Sensor Fusion and Integration for Intelligent Systems (MFI), 2818 IEEEConference on, IEEE, Piscataway, NJ' USA, Sep. 5, 2010; 26-31.

Kejariwal, "Introducing practical and robust anomaly detection in a time series," accessed on the Internet at: https://blog.twitter.com/engineering/en_us/a/2015/introducing-practical-and-robust-anomalydetection-in-a-time-series.html; downloaded on Dec. 17, 2018.

Kotzias et al., "Measuring PUP Prevalence and PUP Distribution through Pay-Per-Install Services," USENIX Association, 25th USENIX Security Symposium, pp. 739-756, downloaded on Jan. 6, 2017 from: https://www.usenix.org/sites/default/files/sec16_full_proceedings_interior.pdf.

Oentaryo et al., "Detecting click fraud in online advertising," Journal of Machine Learning Research, MIT Press; 15(1): 99-140; Jan. 2014.

O'Malley, "Click Fraud Costs Marketers $11B, IAB Issues Key Report," accessed on the Internet at: http://www.mediapost.com/publications/article/218549/click-fraud-costs-marketers-11b-iab-issueskey-r.html; downloaded Jan. 30, 2014.

Vrancia, "Bogus Web Traffic Continues to Plague the Ad Business," accessed on the Internet at: https://www.wsj.com/articles/bogus-web-traffic-continues-to-plague-the-ad-business-1453204801; downloaded Jan. 19, 2016.

Int'l Search Report and Written Opinion of the ISA/EP in PCT/US2018/041582; dated Oct. 10, 2018; 14 pgs.

Int'l Search Report and Written Opinion of the ISA/EP in PCT/US2018/046045; dated Oct. 9, 2018; 13 pgs.

Int'l Search Report and Written Opinion of the ISA/EP in PCT/US2018/041580; dated Oct. 15, 2018; 15 pgs.

Int'l Search Report and Written Opinion of the ISA/EP in PCT/US2018/052859; dated Nov. 28, 2018; 16 pgs.

"Why every digital advertiser should demand transparency," accessed on the Internet at: <https://marketingland.com/every-digital-advertiser-demand-transparency-187332>>; downloaded on Feb. 22, 2019 (5 pgs).

Int'l Search Report and Written Opinion of the ISA/EP in PCT/US2018/059194; dated Feb. 14, 2019; 15 pgs.

Liu et al., "Isolation Forest," available at <https://cs.nju.edu.cn/zhouzh/zhouzh.files/publication/icdm08b>; Published in 2008 Eighth IEEE International Conference on Data Mining; Dec. 15-19, 2008; 10 pgs.

Narayanan et al., "Robust De-anonymization of Large Sparse Datasets," 2014 IEEE Symposium on Security and Privacy; May 1, 2008; pp. 111-125.

U.S. Appl. No. 16/032,402, filed Jul. 11, 2018, Temporal Anomaly Detection System and Method, Wang et al.

U.S. Appl. No. 16/059,391, filed Aug. 9, 2018, System and Method for Assessing Publisher Quality, Bhushanam et al.

U.S. Appl. No. 16/142,524, filed Sep. 26, 2018, System and Method for Detecting Fraudulent Software Installation Activity, Wang et al.

(56) References Cited

OTHER PUBLICATIONS

U.S. Appl. No. 16/180,261, filed Nov. 5, 2018, System and Method for Inferring Anonymized Publishers, Bhushanam et al.

* cited by examiner

SYSTEM AND METHOD FOR DETECTING FRAUDULENT ACTIVITY ON CLIENT DEVICES

CROSS-REFERENCE TO RELATED APPLICATIONS

This application claims the benefit of U.S. Provisional Patent Application No. 62/545,623, filed Aug. 15, 2017, the entire contents of which are incorporated by reference herein.

BACKGROUND

The present disclosure relates generally to anomaly detection and, in certain examples, to systems and methods for detecting and managing fraud associated with digital content presentations on client devices.

In general, client devices are capable of presenting a wide variety of content, including images, video, audio, and combinations thereof. Such content can be stored locally on client devices and/or can be sent to the client devices from server computers over a network (e.g., the Internet). To watch an online movie, for example, a user of a client device can download a copy of the movie and/or can stream the movie from a content provider. Online content can be provided to client devices by publishers, such as websites and software applications.

Users can interact with content in various ways. A user can, for example, view images, listen to music, or play computer games. With certain online content, a user can select the content or a portion thereof and be directed to a website where further content can be presented or obtained. In some instances, users can download or receive content in the form of software applications.

SUMMARY

In general, the subject matter of this disclosure relates to detecting and managing anomalies related to user interactions with content presented on client devices. Particular examples relate to detecting and managing click fraud, in which fake or phony clicks (e.g., mouse clicks or similar user inputs) are generated for client devices. In preferred implementations, the systems and methods described herein detect click fraud using a combination of real-time detection and batch anomaly detection. The real-time detection can involve, for example, monitoring a real-time stream of click data for a plurality of client devices. When the real-time stream indicates that clicks are being generated on a low-reputation client device, an alert can be generated and appropriate action can be taken to prevent further clicks on the device. The low-reputation device can be, for example, a device that was previously associated with fraudulent clicks and/or is listed in a device blacklist. Additionally or alternatively, the batch detection can involve, for example, processing batches of click data for individual client devices to look for click patterns associated with click fraud. When such a pattern is discovered, the blacklist can be updated to list the device and/or appropriate action can be taken to stop or prevent additional click fraud on the device.

Advantageously, the anomaly detection systems and methods described herein can leverage novel algorithms and/or big data platforms to extract actionable insights and help content users, buyers, publishers, or distributors take action in the event of anomalous or fraudulent click behavior. The algorithmic-based approach described herein is particularly important and valuable, given a constantly evolving nature of online fraud and a consequent need for anomaly detection processes to be auto-adaptive. More particularly, the examples described herein can include a click fraud detection architecture that marries the strengths of real-time and batch anomaly detection algorithms. A framework is provided in which two branches of click fraud detection can work together to surface click fraud while enabling the anomaly detection system to be timely updated and extensible.

Advantageously, the systems and methods described herein can achieve an improved ability to detect and diagnose click fraud activity. Real-time detection allows click fraud from low-reputation sources to be identified and stopped quickly. Batch detection can detect a variety of click fraud patterns and identify any new devices and/or publishers that are engaging in click fraud. Additionally or alternatively, the use of multiple detection algorithms can greatly improve detection accuracy and efficiency. In general, the approach represents a substantial improvement in the ability of a computer to detect and prevent click fraud and other click anomalies.

In one aspect, the subject matter described in this specification relates to a computer-implemented method. The method includes: obtaining a stream of data including a record of clicks on a plurality of client devices; aggregating the stream of data to generate a batch click stream for each of the client devices; processing the stream of data using a real-time anomaly detector to detect a first anomaly indicating that at least one of the client devices was previously associated with fraudulent clicks; processing each batch click stream using a batch anomaly detector to detect a second anomaly indicating that at least one of the batch click streams includes fraudulent clicks; and facilitating an adjustment of content presentations on the client devices, based on at least one of the detected first anomaly and the detected second anomaly.

In certain examples, the stream of data can include a real-time click stream. The record of clicks can include a timestamp and a client device identifier. Processing the stream of data can include sending each click record to the real-time anomaly detector when the click record is obtained. Processing the stream of data can include determining that a device blacklist identifies the at least one of the client devices. Processing each batch click stream can include sending a batch of click records for one of the client devices to the batch anomaly detector.

In various implementations, the batch anomaly detector can include a plurality of detection algorithms, and each detection algorithm can be configured to detect at least one distinct anomaly from a plurality of detectable anomalies. Processing each batch click stream can include selecting, for each batch click stream, at least one detection algorithm from the plurality of detection algorithms. Facilitating the adjustment can include preventing at least one publisher from presenting content on the client devices. The method can include: identifying at least one of the client devices as being associated with the second anomaly, and adding the identified at least one of the client devices to a blacklist.

In another aspect, the subject matter described in this specification relates to a system having one or more computer processors programmed to perform operations including: obtaining a stream of data including a record of clicks on a plurality of client devices; aggregating the stream of data to generate a batch click stream for each of the client devices; processing the stream of data using a real-time anomaly detector to detect a first anomaly indicating that at least one of the client devices was previously associated with fraudulent clicks; processing each batch click stream using a batch anomaly detector to detect a second anomaly indicating that at least one of the batch click streams includes fraudulent clicks; and facilitating an adjustment of content presentations on the client devices, based on at least one of the detected first anomaly and the detected second anomaly.

In certain instances, the stream of data can include a real-time click stream. The record of clicks can include a timestamp and a client device identifier. Processing the stream of data can include sending each click record to the real-time anomaly detector when the click record is obtained. Processing the stream of data can include determining that a device blacklist identifies the at least one of the client devices. Processing each batch click stream can include sending a batch of click records for one of the client devices to the batch anomaly detector.

In various examples, the batch anomaly detector can include a plurality of detection algorithms, and each detection algorithm can be configured to detect at least one distinct anomaly from a plurality of detectable anomalies. Processing each batch click stream can include selecting, for each batch click stream, at least one detection algorithm from the plurality of detection algorithms. Facilitating the adjustment can include preventing at least one publisher from presenting content on the client devices. The operations can include: identifying at least one of the client devices as being associated with the second anomaly, and adding the identified at least one of the client devices to a blacklist.

In another aspect, the subject matter described in this specification relates to an article. The article includes a non-transitory computer-readable medium having instructions stored thereon that, when executed by one or more computer processors, cause the computer processors to perform operations including: obtaining a stream of data comprising a record of clicks on a plurality of client devices; aggregating the stream of data to generate a batch click stream for each of the client devices; processing the stream of data using a real-time anomaly detector to detect a first anomaly indicating that at least one of the client devices was previously associated with fraudulent clicks; processing each batch click stream using a batch anomaly detector to detect a second anomaly indicating that at least one of the batch click streams comprises fraudulent clicks; and facilitating an adjustment of content presentations on the client devices, based on at least one of the detected first anomaly and the detected second anomaly.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

In general, the subject matter of this disclosure relates to detecting and managing anomalies related to digital content presented by a group of publishers (e.g., websites and/or software applications) on client devices. Users of the client devices can interact with the content and can take certain action (e.g., install a software application) in response to the content. When such user action is attributed to a specific publisher, the publisher can receive compensation. This can incentivize publishers to engage in fraudulent activity in an effort to obtain the attribution and compensation. For example, a publisher can engage in click fraud by generating fraudulent clicks on client devices. In certain examples, "click fraud" can refer to a form of fraudulent activity in which a publisher or other component or entity generates fake or phony clicks on one or more client devices, and/or provides an indication that such fake or phony clicks have occurred on the one or more client devices. It is estimated that click fraud results in losses of about $12 billion annually, and such losses are projected to increase.

In various examples, a "click" can refer to an action taken by a user to select an item presented on a display, such as a computer screen, a computer monitor, or a mobile device display. A click can be, for example, a mouse click, a tap on a touch screen (e.g., with a finger or stylus), or a press of a button (e.g., on a keyboard or other input device). Other types of clicks are possible. Likewise, "click data" can refer to a record of clicks that have occurred on one or more client devices. The click data can identify, for example, a time for each click and a device on which each click occurred. Additionally, a "stream" of click data can refer to a sequence of click records for one or more client devices. The records in a click stream can be presented in a sequential or chronological order.

Figure 1:
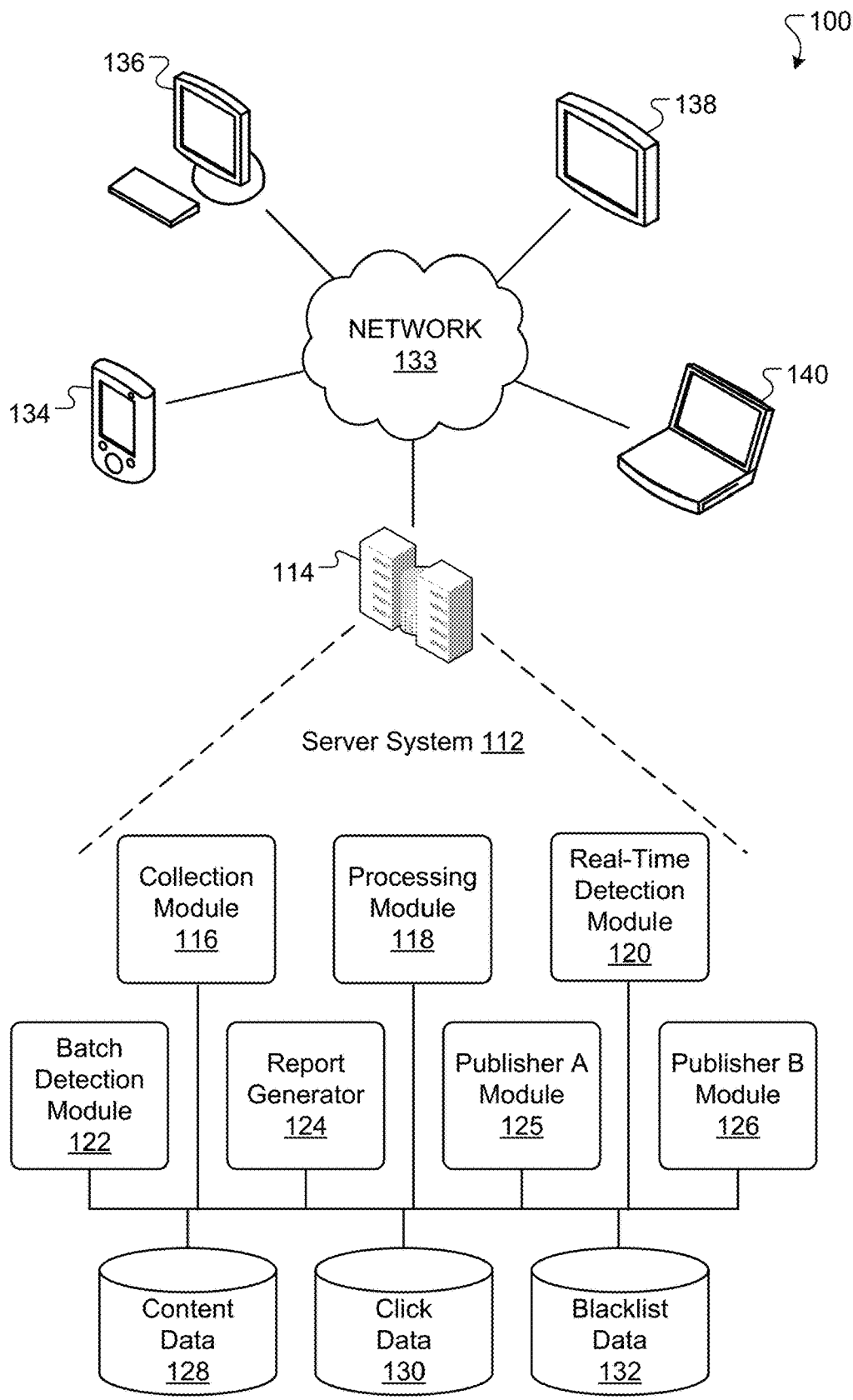
FIG. 1 is a schematic diagram of an example system for detecting and managing anomalies associated with click streams for client devices.

FIG. 1 illustrates an example system 100 for detecting and managing anomalies associated with click streams for a plurality of client devices. A server system 112 provides functionality for collecting and processing click stream data and for detecting anomalies present in the click stream data. The server system 112 includes software components and databases that can be deployed at one or more data centers 114 in one or more geographic locations, for example. In certain instances, the server system 112 is, includes, or utilizes a content delivery network (CDN). The server system 112 software components can include a collection module 116, a processing module 118, a real-time detection module 120, a batch detection module 122, a report generator 124, a publisher A module 125, and a publisher B module 126. The software components can include subcomponents that can execute on the same or on different individual data processing apparatus. The server system 112 databases can include a content data 128 database, a click data 130 database, and a blacklist data 132 database. The databases can reside in one or more physical storage systems. The software components and data will be further described below.

An application, such as, for example, a web-based application, can be provided as an end-user application to allow users to interact with the server system 112. The client application or components thereof can be accessed through a network 133 (e.g., the Internet) by users of client devices, such as a smart phone 134, a personal computer 136, a tablet computer 138, and a laptop computer 140. Other client devices are possible. In alternative examples, the content data 128 database, the click data 130 database, the blacklist data 132 database, or any portions thereof can be stored on one or more client devices. Additionally or alternatively, software components for the system 100 (e.g., the collection module 116, the processing module 118, the real-time detection module 120, the batch detection module 122, the report generator 124, the publisher A module 125, and the publisher B module 126) or any portions thereof can reside on or be used to perform operations on one or more client devices.

FIG. 1 depicts the collection module 116, the processing module 118, the real-time detection module 120, the batch detection module 122, the report generator 124, the publisher A module 125, and the publisher B module 126 as being able to communicate with the content data 128 database, the click data 130 database, and the blacklist data 132 database. The content data 128 database generally includes digital content that can be presented on the client devices. The digital content can be or include, for example, images, videos, audio, computer games, text, messages, offers, and any combination thereof. The click data 130 database generally includes information related to clicks generated by users who interact with content presented on client devices. Such information, also referred to as click data, can include, for example, a device identifier or device ID, a content identifier (e.g., an identification of a specific video or image), a content type (e.g., image, video, and/or audio), a timestamp (e.g., date and time), an IP address, a device geographical location (e.g., city, state, and/or country), and any combination thereof. For example, when a user clicks an item of content presented on a client device, information related to the click (e.g., the device identifier, the content identifier, the timestamp, etc.) can be received by and stored in the click data 130 database. The blacklist data 132 database generally includes a listing of client devices, publishers, and other sources that have been previously associated with fraudulent click activity. Such information can include, for example, a device identifier, a publisher identifier, a date or time of previous fraudulent activity, a device geographical location, an IP address, and any combination thereof.

In general, digital content (e.g., from the content data 128 database) can be presented on the client devices using a plurality of publishers, which can include the publisher A module 125 and the publisher B module 126. Any suitable number of publishers and publisher modules are possible. Each publisher can be or include, for example, a website and/or a software application configured to present the content. When an item of content is presented on a client device, the user can interact with the content in multiple ways. For example, the user can view the content, select or click one or more portions of the content, play a game associated with the content, and/or take an action associated with the content. In certain instances, the action can be or include, for example, watching a video, viewing one or more images, selecting an item (e.g., a link) in the content, playing a game, visiting a website, downloading additional content, and/or installing a software application. In some instances, the content can offer the user a reward in exchange for taking the action. The reward can be or include, for example, a credit to an account, a virtual item or object for an online computer game, free content, or a free software application. Other types of rewards are possible.

Additionally or alternatively, in some instances, the publishers can be rewarded based on actions taken by users in response to the displayed content. For example, when a user clicks or selects an item of content or takes a certain action in response to the content, the publisher can receive a reward or compensation from an entity (e.g., a person or a company) associated with the content or the action. The reward or compensation can provide an incentive for the publisher to display the content.

In some instances, for example, a publisher can receive compensation when it presents an item of content on a client device and a user installs a software application (or takes a different action) in response to the content. The publisher can provide information to the collection module 116 indicating that the content was presented on the client device. Alternatively or additionally, the collection module 116 can receive an indication that the user selected the content and/or that the software application was installed. Based on the received information, the collection module 116 can attribute the software application installation to the item of content presented by the publisher. The publisher can receive the compensation based on this attribution.

In various examples, the collection module 116 can be or include an attribution service provider. The attribution service provider can receive information from publishers related to the presentation of content and user actions in response to the content. The attribution service provider can determine, based on the information received, how to attribute the user actions to individual publishers. In some instances, for example, a user can visit or use websites or software applications provided by publishers that present an item of content at different times on the user's client device. When the user takes an action (e.g., installs a software application) in response to the content presentations, the attribution service provider may select one of the publishers to receive the credit or attribution for the action. The selected publisher may be, for example, the publisher that was last to receive a click on the content before the user took the action. The selected publisher can receive compensation from an entity associated with the content or the action. Other publishers that presented the item of content and or received clicks on the content may receive no such compensation.

This scheme in which publishers can receive compensation based on attribution for user actions can result in fraudulent publisher activity. For example, a fraudulent publisher can send incorrect or misleading information to the collection module 116 (or attribution server provider) in an effort to fool the collection module 116 into attributing user action to content presented by the publisher. The fraudulent publisher can, for example, provide information to the collection module 116 indicating that the content was displayed on the user's client device when the content was not in fact displayed. Additionally or alternatively, the fraudulent publisher can provide information to the collection module 116 indicating that the user interacted with the content (e.g., clicked on the content) when such interactions did not occur. Based on this incorrect information, the collection module 116 (or attribution service provider) can erroneously attribute user action (e.g., a software application installation) to the fraudulent publisher, which may be rewarded (e.g., with money) for its deceitful activity.

Fraudulent or false clicks can occur in various scenarios. For example, technical integration issues among computer systems can result in false clicks. Such integration issues can cause, for example, a presentation of content to be erroneously counted as a click on the content. Alternatively or additionally, a fraudulent publisher can generate a high volume of false random clicks or evenly spaced clicks in an effort to steal attribution from legitimate publishers. Fraudulent publishers can use bots or automated machines to click on content, with little or no human interaction. In some cases, malicious software can be used to hijack a client device and use cookies to mimic the user's viewing and clicking behavior. Alternatively or additionally, publishers can hide content (e.g., under other displayed content) and can count user clicks on visible items as clicks on the hidden content.

Figure 2:
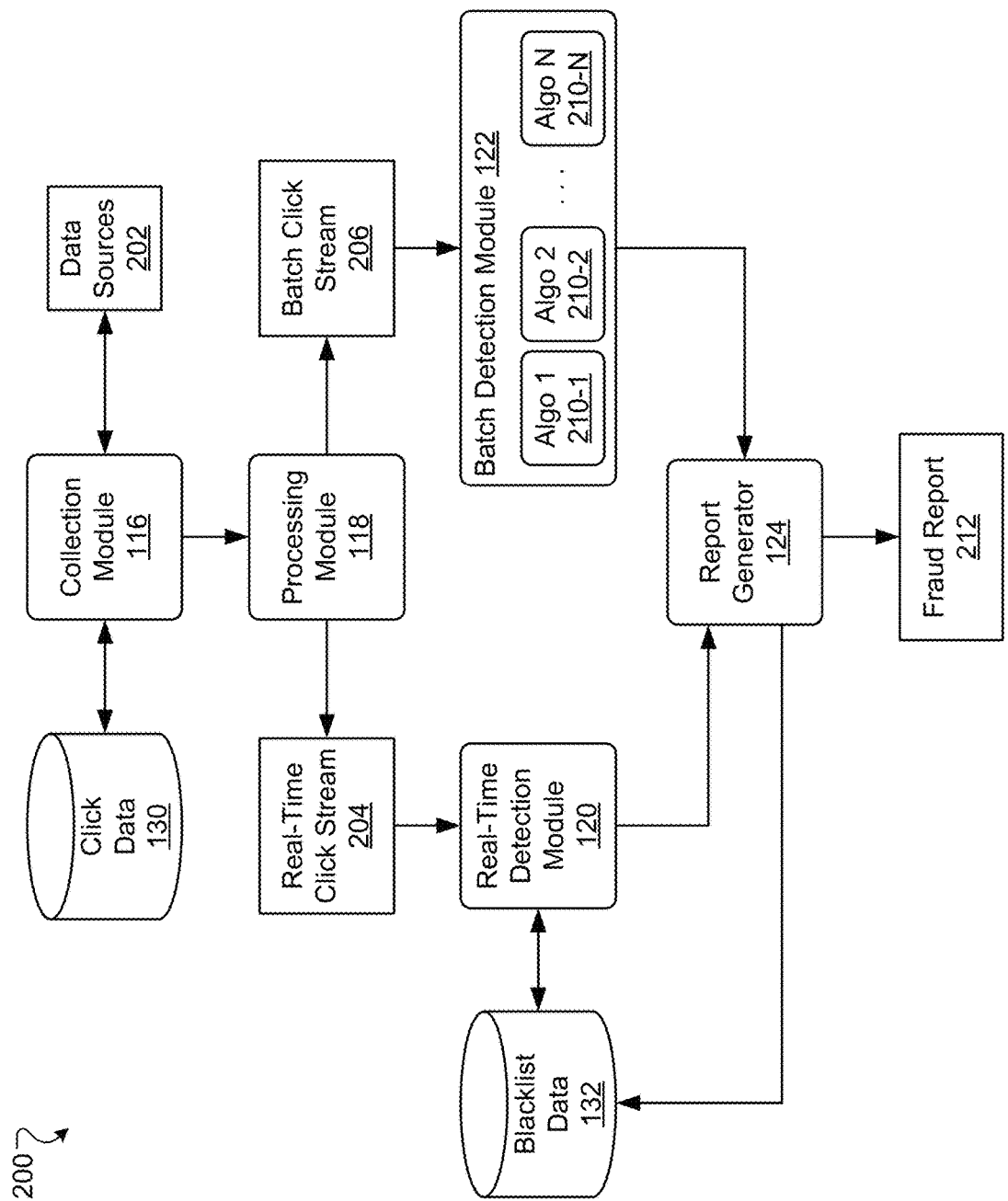
FIG. 2 is a schematic data flow diagram of an example system for detecting and managing click fraud on client devices.

Referring to FIG. 2, in various examples, a system 200 for detecting click fraud includes the collection module 116, the processing module 118, the real-time detection module 120, the batch detection module 122, and the report generator 124. The collection module 116 can receive click data from one or more data sources 202. The click data can be or include, for example, a stream of data including a record of clicks on the client devices. The stream of data can be a live data stream, such that data for a click can be received immediately or shortly (e.g., within seconds or minutes) after the clicks are generated. The data sources 202 can be or include, for example, one or more publishers, such as the publisher A module 125 and the publisher B module 126, and/or one or more client devices. The click data can be stored in the click data 130 database.

The click data can be provided from the collection module 116 or the click data 130 database to the processing module 118. The processing module 118 can cleanse the click data to remove any erroneous data or handle any missing or inaccurate data. Additionally or alternatively, the data processing module 118 can aggregate the click data by client device, such that click data for each individual client device can be extracted and/or separated from other click data. The processing module 118 uses the click data to generate a real-time click stream 204 and a batch click stream 206, which can be processed using the real-time detection module 120 and the batch detection module 122, respectively, as described herein.

In general, the real-time click stream 204 can be or include, for example, the click data received from the data sources 202, which can be cleansed or processed by the processing module 118. The real-time click stream 204 can be or include, for example, a live record of clicks that are occurring on the client devices, as reported by the data sources 202. Alternatively or additionally, the real-time click stream 204 can be or include a record of clicks that have recently occurred or been reported for the client devices, for example, within about the last 0.1 seconds, 1 second, 5 seconds, 30 seconds, 1 minute, 5 minutes, 30 minutes, or other time period. For each click, the record can include, for example, a device identifier, a timestamp, an IP address, a user agent (e.g., a web browser), a device geographical location, an item of content associated with the click, and/or a publisher associated with the click. The real-time click stream 204 can include other click data.

The real-time click stream 204 can be provided to the real-time detection module 120 (alternatively referred to herein as a real-time anomaly detector), which can identify click fraud or similar anomalies present in the real-time click stream 204. In one example, the real-time detection module 120 can process the real-time click stream 204 by filtering and storing click data from low-reputation data sources (e.g., devices or publishers), based on, for example, device IP address, user agent, device ID, device geographical location, and other factors. Low-reputation sources can be identified through historical analysis of previous click data streams. For example, client devices, publishers, and other sources that have been previously associated with click fraud (e.g., during an earlier time period) can be included in a blacklist in the blacklist data 132 database. Any such sources identified in the blacklist can be considered to be low-reputation sources and/or more likely to be associated with click fraud in the future. In some instances, the real-time detection module 120 can monitor the real-time click stream 204 to look for any recent click data from sources identified in the blacklist. If any such click data is present, the real-time detection module 120 can generate an alert of possible or likely click fraud. For example, the real-time detection module 120 can inform other components (e.g., the report generator 124) or users of the system 200 that low-reputation devices are continuing to provide clicks, and that such clicks are likely fraudulent, based on the blacklist. In some examples, any click data in the real-time click stream 204 for low-reputation sources can be filtered, flagged, or removed from the real-time click stream 204. Other click data from more reputable sources can be allowed to pass through for further processing.

Likewise, the batch click stream 206 can be or include a separate batch of click data for each client device during a previous time period (e.g., a previous hour, day, week, or any portion thereof). The processing module 118 can create the separate batches of click data by collecting click data for all client devices during the time period and then aggregating the click data by client device. In a preferred example, a batch of click data for a client device can include a record of all clicks that were generated for the device during the time period. The record for each click can include, for example, a device identifier, a timestamp, an IP address, a user agent, a device geographical location, a content identifier, and/or a publisher identifier.

The batch click stream 206 can be provided to the batch detection module 122 (alternatively referred to herein as a batch anomaly detector), which can use a collection of algorithms to detect click fraud and similar anomalies in the click data. In certain instances, for example, the batch detection module 122 can receive a batch of click data for a client device, select one or more algorithms for processing the click data, and use the selected algorithm(s) to detect any click fraud in the click data. Click fraud can be detected, for example, by comparing the click data to one or more predetermined baselines, thresholds, or acceptable ranges. In the example system 200 of FIG. 2, the batch detection module 122 is depicted as including N separate algorithms, including a first algorithm 210-1, a second algorithm 210-2, . . . , and an Nth algorithm 210-N. The number of available algorithms N can be any integer, preferably greater than or equal to two (e.g., 2, 3, 5, 10, 15, or more).

Each algorithm can include a separate or distinct anomaly detection model, which can utilize, for example, suitable machine-learning techniques or the like. In certain instances, for example, the algorithms can use one or more trained classifiers to detect click fraud. The trained classifiers can be or include, for example, one or more linear classifiers (e.g., Fisher's linear discriminant, logistic regression, Naive Bayes classifier, and/or perceptron), support vector machines (e.g., least squares support vector machines), quadratic classifiers, kernel estimation models (e.g., k-nearest neighbor), boosting (meta-algorithm) models, decision trees (e.g., random forests), neural networks, and/or learning vector quantization models. Other classifiers can be used.

Once trained, the one or more classifiers can receive a batch of click data as input and can provide an indication of click fraud as output. The output can be or include, for example, a probability that the batch of click data includes or is associated with click fraud.

In preferred implementations, each batch of click data can be processed separately by one or more of the algorithms in the batch detection module 122, and each algorithm can be tailored to detect a specific type of click fraud, which can occur in many different forms and patterns. The algorithms can employ multiple fraud detection metrics or pattern recognition techniques to detect various click patterns. For example, "fast clicks" are rapid clicks that occur in short time intervals on the same device, while "space clicks" are clicks that occur at evenly spaced time intervals (e.g., every 10 seconds) on the same device. Appropriate baselines or thresholds to identify these and other click patterns can be determined by statistical analysis and/or sequence mining (e.g., anomaly detection in sequence mining, evenly spaced sequence mining, frequency cap analysis, or the like).

Figure 3:
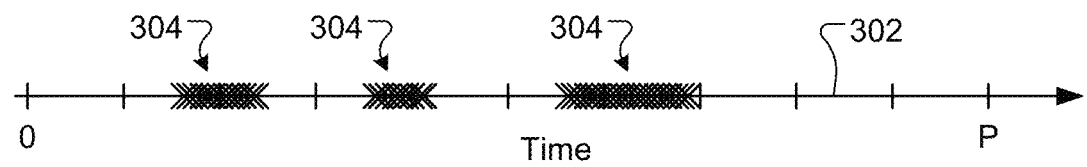
FIG. 3 is a timeline of an example history of clicks for a client device during a time period.
Figure 4:
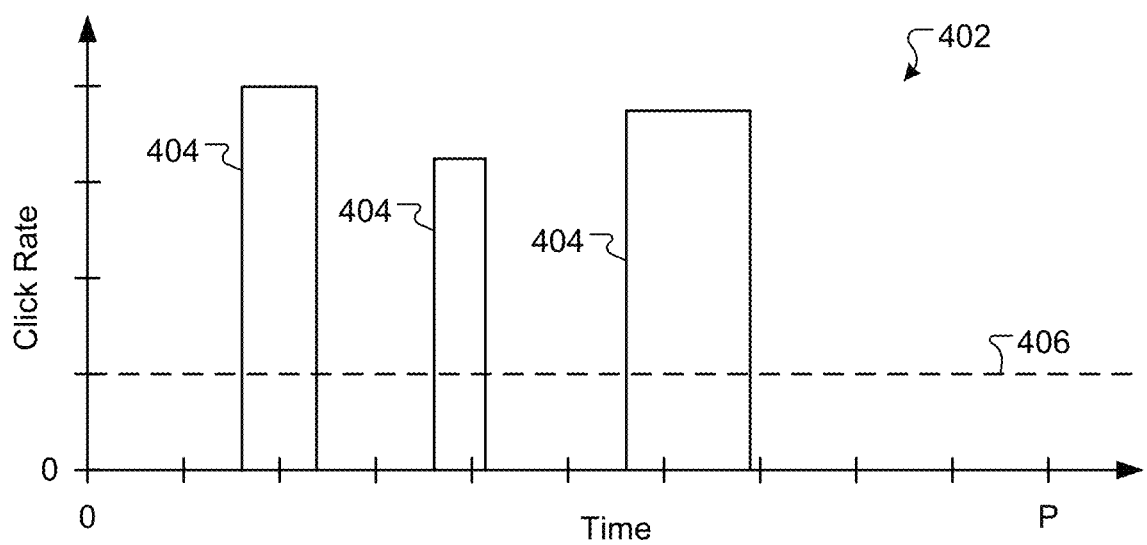
FIG. 4 is a plot of click rate for the history of clicks in FIG. 3 during the time period.

For example, FIG. 3 includes an example timeline 302 in which groupings of fast clicks 304 occurred on a client device during a time period P. Each click in this example is represented by an "X" symbol in the timeline 302. To detect click fraud in such a case, an algorithm can calculate a click rate (e.g., in clicks per second) at each time during the time period P. The click rate can be determined, for example, by calculating a time difference between two or more consecutive clicks. FIG. 4 includes a plot 402 of click rate vs. time for the example timeline 302. Due to the groupings of fast clicks 304, the plot 402 includes corresponding spikes 404 in the click rate. Based on historical data, the algorithm can determine a threshold 406 above which click fraud is likely to have occurred. In this case, the algorithm can determine that click fraud occurred or likely occurred, given that the click rate spikes 404 exceed the threshold 406.

Figure 5:
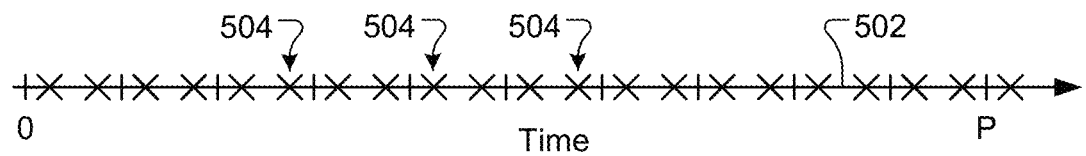
FIG. 5 is a timeline of an example history of clicks for a client device during a time period.
Figure 6:
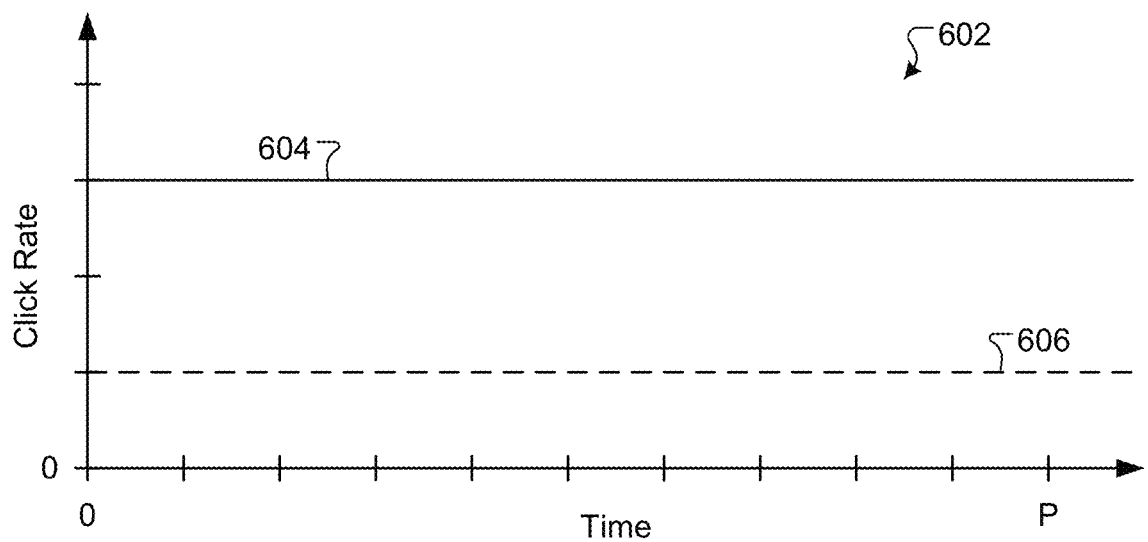
FIG. 6 is a plot of click rate for the history of clicks in FIG. 5 during the time period.

Similarly, FIG. 5 includes an example timeline 502 in which space clicks 504 occurred on a client device during a time period P. To detect click fraud in such a case, an algorithm can calculate a click rate (e.g., in clicks per second) at each time during the time period P. The click rate can be determined, for example, by calculating a time difference between two or more consecutive clicks. FIG. 6 includes a plot 602 of click rate vs. time for the example timeline 502. Due to the space clicks 504, the plot 602 includes a constant click rate 604 during the time period P. Based on historical data, the algorithm can determine a threshold 606 above which click fraud is likely to have occurred. In this case, the algorithm can determine that click fraud occurred or likely occurred, given that the click rate 604 exceeds the threshold 606. Additionally or alternatively, the algorithm can detect the fraudulent space clicks 504 by recognizing that a time interval between successive clicks is constant and/or that the click rate 604 is constant.

While FIGS. 3 and 5 depict examples of fast clicks and space clicks, respectively, it is understood that click fraud can have many different forms and patterns, including patterns that appear to be random. For example, while the click rate with space clicks can be substantially constant, the click rate in other forms of click fraud can vary over time, in a wide variety of functional forms, such as linear, quadratic, parabolic, sinusoidal, exponential, logarithmic, or any combination thereof. New forms of click fraud are constantly being developed by fraudsters in an ongoing effort to avoid detection.

In some instances, the detection algorithms can detect click fraud by measuring a number of clicks for a client device over a time period, such as, for example, 1 second, 1 minute, or 1 hour. When the number of clicks during the time period exceeds a threshold value T, the detection algorithms can conclude that there is a high likelihood (e.g., more than 50% or 90%) of click fraud. The threshold value T can be determined based on, for example, a historical analysis of click histories on client devices. The threshold value T can be, for example, $T=X+(C)(S)$, where X is a median or average click rate, S is a standard deviation, and C is any positive number, such as 1, 1.5, 2, or 3. In general, the goal in such a case is to identify instances where the click rate (or other click parameter, such as click spacing) deviates in a statistically significant manner from a median or average historical value. Statistical tests, such as, for example, a t-test, a p-test, and so forth, can be used to define or identify deviations as being statistically significant.

Alternatively or additionally, the threshold (e.g., the threshold value T) can be based on a statistical quantile of data from a corresponding previous time period, preferably for all publishers and client devices. A large quantile can be chosen as the threshold, so that any data that crosses the threshold can be considered to have a statistically significant deviation from other data. For any fraud metric, when a source (e.g., a publisher or client device) is statistically significantly deviated from a baseline (e.g., a threshold is exceeded), the source can be identified as exhibiting click fraud or as having a high likelihood of being associated with click fraud. Information related to each click from the identified source can be stored for further downstream aggregation, summary, or troubleshooting. In some instances, for example, data related to click fraud can be used to identify devices associated with other forms of fraud, such as software installation fraud.

Referring again to FIG. 2, in some examples, the batch detection module 122 can achieve dynamic anomaly detection by taking into account variable factors, such as, for example, seasonality and trend, and/or by making use of dynamic baselines or thresholds to identify statistically significant outliers. In general, a dynamic threshold or baseline can account for variations or changes that occur over time, for example, during an hour, a day, a week, a month, or longer. For example, user interactions with client devices (e.g., clicks and software application installs) can exhibit daily or weekly seasonality in which the interactions can vary in a repetitive manner (e.g., more activity during evenings or on weekends). By using dynamic thresholds that can change over time, the system 200 can account for such variations and achieve more accurate click fraud detections with fewer false positives. By comparison, constant or static thresholds can fail to detect new forms of click fraud that can appear on an ongoing basis. A robust, dynamic baseline or threshold can be generated by considering the most recent click data and/or by performing data-cleansing, such as, for example, outlier removal, robust metric selection, and the like.

Outputs from the real-time detection module 120 and the batch detection module 122 can be provided to the report generator 124, which can generate a fraud report 212 of any click fraud activity. In some instances, for example, the report generator 124 can collect fraudulent clicks or reports of fraudulent clicks from the real-time detection module 120 and the batch detection module 122 and provide the fraud report 212 to users of the system 200. The users can use the report to optimize future content presentations, for example, by avoiding or shutting down certain users or publishers who have engaged in click fraud. The report can also be used to request or obtain refunds from any publishers that received compensation based on fraudulent activity. The fraud report 212 can be or include an electronic file that is generated or updated on a periodic basis, such as every hour, day, or week. The fraud report 212 can include, for example, an identification of any client devices and/or publishers associated with click fraud. The fraud report 212 can include fraudulent click counts and/or an identification of any different types of click fraud (e.g., fast clicks or space clicks). In preferred examples, the report generator 124 can update the blacklist data 132 database to include a current listing of any client devices and/or publishers that have been associated with click fraud, for example, as determined by the batch detection module 122.

Given that the real-time detection module 120 and the batch detection module 122 analyze click data derived from a common data stream received from the data sources 202, the real-time detection module 120 and the batch detection module 122 can, in some instances, generate duplicate alerts of click fraud. In general, the real-time detection module 120 can detect click fraud in real-time, while the batch detection module 122 can detect fraud periodically (e.g., daily). The resulting fraud report 212 can include summaries of the real-time and periodic fraud detections. In some instances, the fraud report 212 can utilize or include a fraud scoring system in which sources (e.g., publisher or client device) can be sorted according to fraud severity, where the severity can be evaluated and aggregated over outputs from all detectors.

Advantageously, the ability to perform real-time click fraud detection can allow the system 200 and/or users thereof to identify a fraud source (e.g., a fraudulent publisher) as soon as possible, such that the source can be shut down quickly and further financial losses due to the fraud can be avoided. Additionally or alternatively, stopping fraudulent clicks in real-time can help achieve a more accurate attribution of user activity (e.g., application installs) to content presented on client devices.

In various instances, the systems and methods described herein can perform click fraud detection at a device level. Such device-level granularity can assist with resolving disputes and/or selecting publishers for further content presentations. For example, refund amounts can be calculated fractionally, based on the fraudulent devices. Additionally or alternatively, the anomaly can be more deeply investigated (e.g., at a device level), which can allow publishers to troubleshoot click fraud or technical integration issues more efficiently.

Several different actions can be taken, preferably automatically, in response to identified click fraud or other click anomalies. When a publisher is identified to have engaged in click fraud activity, for example, the publisher can be added to a blacklist (e.g., the blacklist data 132 database) and/or can be prevented from presenting content on client devices in the future. In some instances, the fraudulent activity can be brought to the publisher's attention and/or the publisher may provide a refund of any compensation earned from the fraudulent activity. Alternatively or additionally, when a click anomaly is identified as being associated with positive (e.g., not fraudulent) publisher activity, the publisher can be used to present additional content or a higher volume of content in the future. In general, the report generator 124 and/or users of the system 200 can use the click fraud results to make decisions regarding how and where to present content going forward. Publishers who are identified as performing well can be used more in the future, and publishers who are identified as performing poorly or fraudulently can be used less in the future or not at all.

Additionally or alternatively, the click fraud results can be used to properly attribute user action to content presentations. As mentioned above, when a user takes an action (e.g., installs a software application) in response to a content presentation, a publisher may be selected to receive credit or attribution for the action, and the selected publisher may receive compensation for such attribution. Advantageously, the systems and methods described herein can be used to prevent or correct any attribution due to fraudulent clicks. Additionally or alternatively, the systems and methods can be used to determine a proper attribution, by considering only clicks that are not fraudulent. In some instances, the systems and methods can be used to revoke or not authorize a prior attribution that was based on fraudulent clicks, or to withhold any requested compensation based on fraudulent clicks.

To extract actionable insights from big data, it can be important in some examples to leverage big data technologies, so that there is sufficient support for processing large volumes of data. Examples of big data technologies that can be used with the systems and methods described herein include, but are not limited to, APACHE HIVE and APACHE SPARK. In general, APACHE HIVE is an open source data warehousing infrastructure built on top of HADOOP for providing data summarization, query, and analysis. APACHE HIVE can be used, for example, as part of the processing module 118 to generate and/or process the real-time click stream 204 and/or the batch click stream 206. APACHE SPARK is, in general, an open source processing engine built around speed, ease of use, and sophisticated analytics. APACHE SPARK can be leveraged to detect abnormal deviations in a scalable and timely manner. APACHE SPARK can be used, for example, to process the real-time click stream 204 and/or the batch click stream 206 and any batches of click data handled by the batch detection module 122. In general, the real-time capabilities of the systems and methods described herein can be achieved or implemented using APACHE SPARK or other suitable real-time platforms that are capable of processing large volumes of real-time data.

The systems and methods described herein are generally configured in a modular fashion, so that extending underlying algorithms to new sources and modifying or adding underlying algorithms can be done with minimal effort. This allows the anomaly detection systems and methods to be refined and updated, as needed, to keep up with new forms of click fraud being created by fraudsters on an ongoing basis. The algorithms in the batch detection module 122 can operate independently from one another, which can allow new algorithms to be implemented and used, without adversely impacting predictive capabilities of existing algorithms. As additional novel algorithms are developed for click fraud detection, an overall capability and accuracy of the systems and methods can grow monotonically.

Figure 7:
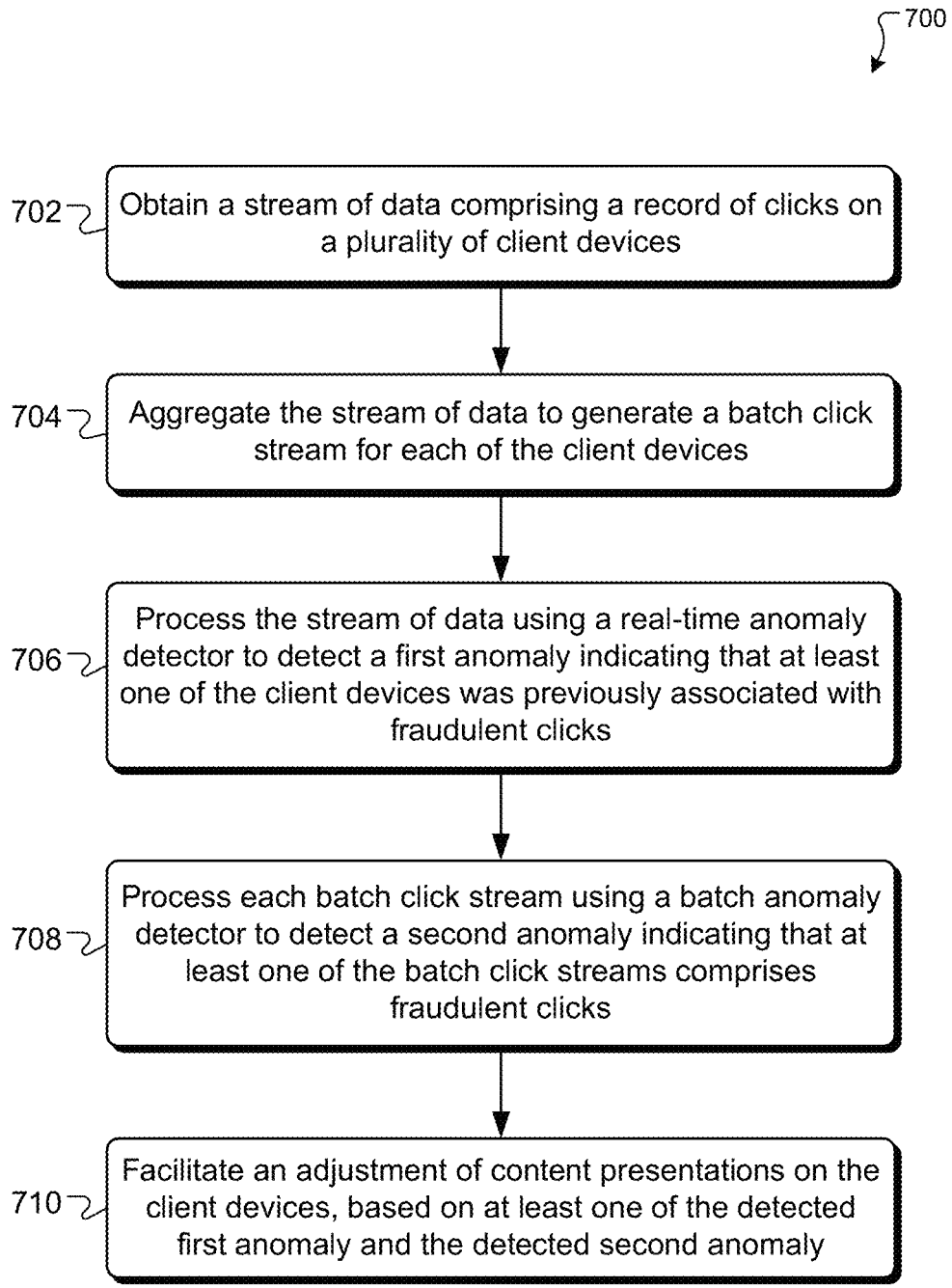
FIG. 7 is a flowchart of an example method of detecting and managing anomalies associated with click streams for client devices.

FIG. 7 illustrates an example computer-implemented method 700 of detecting and managing click fraud. A stream of data is obtained (step 702) that includes a record of clicks on a plurality of client devices. The stream of data is aggregated (step 704) to generate a batch click stream for each of the client devices. The stream of data is processed (step 706) using a real-time anomaly detector to detect a first anomaly indicating that at least one of the client devices was previously associated with fraudulent clicks. Each batch click stream is processed (step 708) using a batch anomaly detector to detect a second anomaly indicating that at least one of the batch click streams includes fraudulent clicks. An adjustment of content presentations is facilitated (step 710)

on the client devices, based on at least one of the detected first anomaly and the detected second anomaly.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
   obtaining a stream of data comprising a record of clicks generated by users on a plurality of user client devices;
   aggregating the stream of data by user client device to generate a batch click stream for each of the user client devices,
   wherein each batch click stream comprises click data for clicks generated on an individual user client device from the plurality of user client devices;
   processing the stream of data using a real-time anomaly detector to detect a first anomaly indicating that at least one of the user client devices was previously associated with fraudulent clicks;
   processing the batch click stream for each user client device using a batch anomaly detector to detect a second anomaly indicating that at least one of the batch click streams comprises fraudulent clicks; and
   facilitating an adjustment of content presentations on the user client devices, based on at least one of the detected first anomaly and the detected second anomaly.

2. The method of claim 1, wherein the stream of data comprises a real-time click stream.

3. The method of claim 1, wherein the record of clicks comprises a timestamp and a client device identifier.

4. The method of claim 1, wherein processing the stream of data comprises:
   sending each click record to the real-time anomaly detector when the click record is obtained.

5. The method of claim 1, wherein processing the stream of data comprises:
   determining that a device blacklist identifies the at least one of the user client devices.

6. The method of claim 1, wherein processing each batch click stream comprises:
   sending a batch of click records for one of the user client devices to the batch anomaly detector,
      wherein the batch anomaly detector comprises a plurality of detection algorithms, and wherein each detection algorithm is configured to detect at least one distinct anomaly from a plurality of detectable anomalies.

7. The method of claim 1, wherein at least one of the user client devices comprises a mobile device on which clicks were generated by at least one of the users.

8. The method of claim 7, wherein processing each batch click stream comprises:
   selecting, for each batch click stream, at least one detection algorithm from the plurality of detection algorithms.

9. The method of claim 1, wherein facilitating the adjustment comprises preventing at least one publisher from presenting content on the user client devices.

10. The method of claim 1, further comprising:
    identifying at least one of the user client devices as being associated with the second anomaly; and
    adding the identified at least one of the user client devices to a blacklist.

11. A system, comprising:
    one or more computer processors programmed to perform operations comprising:
       obtaining a stream of data comprising a record of clicks generated by users on a plurality of user client devices;
       aggregating the stream of data by user client device to generate a batch click stream for each of the user client devices,
          wherein each batch click stream comprises click data for clicks generated on an individual user client device from the plurality of user client devices;
       processing the stream of data using a real-time anomaly detector to detect a first anomaly indicating that at least one of the user client devices was previously associated with fraudulent clicks;

processing the batch click stream for each user client device using a batch anomaly detector to detect a second anomaly indicating that at least one of the batch click streams comprises fraudulent clicks; and facilitating an adjustment of content presentations on the user client devices, based on at least one of the detected first anomaly and the detected second anomaly.

12. The system of claim 11, wherein the stream of data comprises a real-time click stream.

13. The system of claim 11, wherein processing the stream of data comprises:

sending each click record to the real-time anomaly detector when the click record is obtained.

14. The system of claim 11, wherein processing the stream of data comprises:

determining that a device blacklist identifies the at least one of the user client devices.

15. The system of claim 11, wherein processing each batch click stream comprises:

sending a batch of click records for one of the user client devices to the batch anomaly detector, wherein the batch anomaly detector comprises a plurality of detection algorithms, and wherein each detection algorithm is configured to detect at least one distinct anomaly from a plurality of detectable anomalies.

16. The system of claim 11, wherein at least one of the user client devices comprises a mobile device on which clicks were generated by at least one of the users.

17. The system of claim 16, wherein processing each batch click stream comprises:

selecting, for each batch click stream, at least one detection algorithm from the plurality of detection algorithms.

18. The system of claim 11, wherein facilitating the adjustment comprises preventing at least one publisher from presenting content on the user client devices.

19. The system of claim 11, further comprising:

identifying at least one of the user client devices as being associated with the second anomaly; and adding the identified at least one of the user client devices to a blacklist.

20. An article, comprising:

a non-transitory computer-readable medium having instructions stored thereon that, when executed by one or more computer processors, cause the computer processors to perform operations comprising:

obtaining a stream of data comprising a record of clicks generated by users on a plurality of user client devices;

aggregating the stream of data by user client device to generate a batch click stream for each of the user client devices, wherein each batch click stream comprises click data for clicks generated on an individual user client device from the plurality of user client devices;

processing the stream of data using a real-time anomaly detector to detect a first anomaly indicating that at least one of the user client devices was previously associated with fraudulent clicks;

processing the batch click stream for each user client device using a batch anomaly detector to detect a second anomaly indicating that at least one of the batch click streams comprises fraudulent clicks; and facilitating an adjustment of content presentations on the user client devices, based on at least one of the detected first anomaly and the detected second anomaly.

* * * * *